Dec. 17, 1929.  F. SCHMIDT  1,740,041

VALVE

Filed May 24, 1926

Inventor
F. Schmidt

Patented Dec. 17, 1929

1,740,041

UNITED STATES PATENT OFFICE

FRANZ SCHMIDT, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

VALVE

Application filed May 24, 1926. Serial No. 111,194.

This invention relates in general to improvements in valves, and relates more specifically to improvements in the construction and operation of disk valves of the butterfly type.

An object of the invention is to provide a new and useful valve structure for controlling and checking the flow of fluid through conduits. Another object of the invention is to provide improved means for preventing leakage past disk valves of the butterfly type, by insuring tight closing thereof. A further object of the invention is to provide an improved distortable packing for butterfly valves or the like, and means for effecting adjustment of such packings. These and other objects will appear in the course of the following description.

A clear conception of several embodiments of the invention and of the mode of manipulating mechanisms constructed in accordance therewith, may be had by referring to the drawing accompanying and forming a part of this specification in which like reference characters designate the same or similar parts in the several views.

Figure 1:
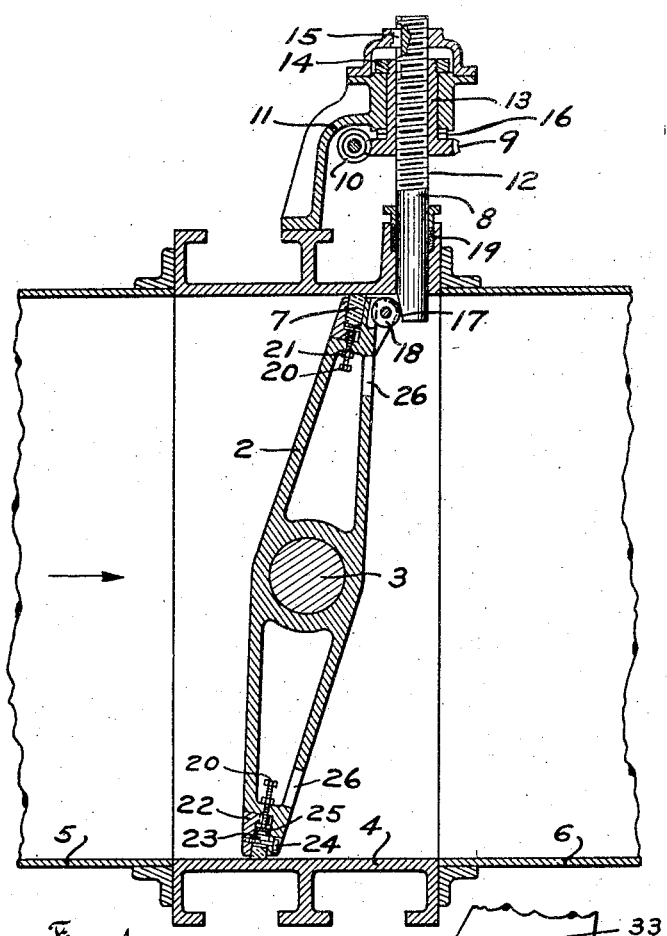
Fig. 1 is a central vertical section through an improved butterfly valve structure and through fragments of the pipe lines communicating therewith.

Referring to the drawing, the butterfly valve which is of the ordinary type, comprises in general a main casing 4 of circular transverse cross-section, and a valve body or disk 2 swingable within the casing 4 by and about the axis of a supporting and actuating shaft 3 which is journalled in and extends transversely of the direction of flow of fluid through the casing 4. As shown, the valve is in closed position, and supply and discharge pipes 5, 6 respectively, communicate with the opposite open ends of the main casing 4. The valve disk 2 has a peripheral recess formed by a removable retainer ring 22 cooperating with an outward extension on the periphery of the disk 2, the retainer ring 22 being detachably and adjustably attached to the disk 2 by means of cap screws 24.

Located within the peripheral recess of the valve disk 2, is a segmental packing or seating 7 which is preferably formed of distortable or pliable material such as soft rubber. The inner portion of the pliable seating segments are protected against distortion by means of a backing 25 formed by metal or other relatively hard material. A plurality of adjusting screws 20 disposed radially with respect to the valve disk 2, are screw threaded for adjustment in the valve body and have their outer extremities directly cooperable with the metal backing 25. The inner extremities of the adjusting screws 20 are provided with manipulating portions which are accessible through lateral openings 26 formed in the valve disk 2. The locking nuts 21 serve to lock the adjusting screws 20 in any desired position of adjustment, and the portions of the screws which penetrate the retaining ring 22 are preferably spaced from the ring in order to permit adjustment thereof laterally of the screws 20. The cap screws 24 which hold the ring 22 in place, pass through elongated openings 23 in the seating 7 in order to avoid interfering with adjustment of the seating segments.

With the embodiment of the invention disclosed in Fig. 1, the upper portion of the valve remote from the axis of the shaft 3 is provided with a roller 18 which is cooperable with the wedge surface 17 of a locking plunger 8 for the purpose of forcing the seating 7 against the casing 4 when the valve is closed, and of locking the valve in closed position.

The plunger 8 is provided with external screw threads 12 cooperating with internal screw threads of a rotary sleeve 13 which is formed integral with a worm wheel 9. The sleeve 13 is rotatably supported by a bracket 11 and is prevented from moving longitudinally of the sleeve axis, by means of an upper collar 14 and a lower thrust bearing 16. The worm wheel 9 meshes with an actuating worm 10 which is rotatably associated with the bracket 11 and is formed to impart rotary motion to the sleeve 13. The plunger 8 is prevented from rotating about its own axis by means of a spline 15 cooperating with a longitudinal groove in the plunger and secured to the bracket 11. This spline 15 while preventing rotation of the plunger 8 about its own axis, permits movement thereof longitudinally of the said axis. A stuffing box 19 prevents leakage of fluid from within the casing 4 past the plunger 8.

Figure 2:
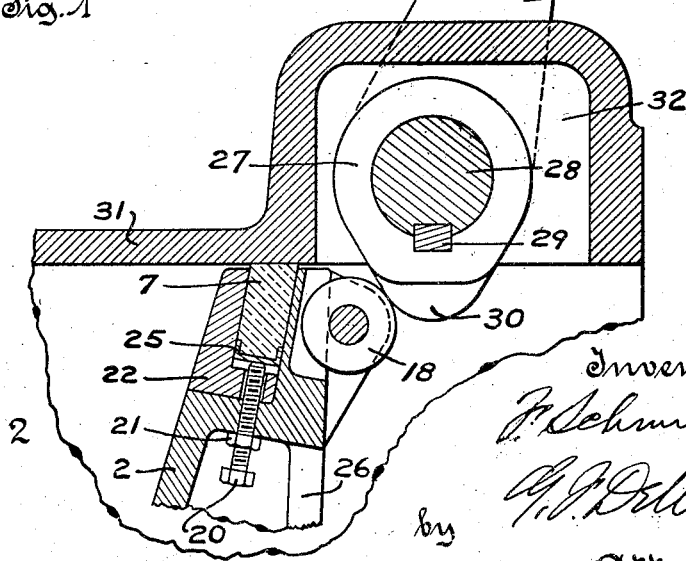
Fig. 2 is a fragmentary enlarged sectional view of a modified form of valve sealing mechanism especially applicable to butterfly valves.

In the specific embodiment of the invention illustrated in Fig. 2, the valve disk 2 is likewise provided with a roller 18 which is cooperable with a locking cam 30. The locking cam 30 is formed integral with a hub 27 which is keyed to a locking shaft 28 by means of a key 29. The shaft 28 is journalled in the valve casing 31 adjacent to a lateral pocket 32 which is of sufficient size to receive the cam 30 when the valve is open. The locking shaft 28 is rotatable from the exterior of the casing 31, by means of a lever 33 and in any convenient manner.

When the valve is open, the disk 2 is disposed in the plane of the common axis of the casing 4, 31 and of the pipes 5, 6. The locking devices are withdrawn from the fluid conduits and fluid is free to pass from the supply pipe 5 to the discharge pipe 6 without further obstruction than that produced by the valve disk 2.

In closing the valve specifically illustrated in Fig. 1, the disk 2 is first swung to closed position causing the pliable seating 7 to engage the inner surface of the casing 4. The plunger 8 is then moved downwardly by operation of the worm 10 thus causing the wedge surface 17 to engage the roller 18 and to distort and force the pliable seating 7 tightly against the adjacent surface of the casing 4 by swinging the disk 2 in a counter-clockwise direction about the axis of the shaft 3. The rotation of the worm 10 produces rotation of the worm wheel 9 and of the sleeve 13, and the rotary motion of the sleeve 13 is converted into longitudinal movement of the plunger 8 by virtue of the screw threads 12.

In closing the valve specifically disclosed in Fig. 2, the valve disk 2 is swung to closed position about the axis of the supporting shaft thus causing the seating 7 to engage the inner surface of the valve casing 31. The lever 33 may then be swung in a clockwise direction to cause the cam 30 to emerge from the recess 32 and to engage the roller 18 associated with the valve disk 2. The cam 30 when thus moved forces the valve disk 2 about its axis in a counter-clockwise direction thereby likewise distorting the pliable segments 7 and insuring tight closing and positive locking of the valve.

Before opening of the butterfly valve can be effected, the locking device must be released, whereupon opening may be accomplished in the usual manner. It will be apparent that either form of locking device insures tight seating after closing and also locks the valve in closed position. If the pliable seating 7 does not properly engage the adjacent surface of the casing 4, 31 during normal closing and without the use of a locking device, proper engagement may be secured by manipulation of the adjusting screws 20. The relatively hard backing 25 associated with the relatively soft seating segments, prevents distortion of the pliable seating 7 by the adjusting screws 20, and also insures effective adjustment of all portions of the seating segments. Upon removal of the retainer ring 20 by release of the cap screws 24, the seating segments 7 are freely removable. As shown in Fig. 1, the cap screws 24 pass through elongated transverse openings 23 in the seating 7, thereby avoiding interference during functioning of the adjusting cap screws 20.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a casing, a valve disk swingable about an axis extending across said casing and having a peripheral recess opening away from the axis of said disk, a soft rubber seating disposed within said recess and cooperable with the interior of said casing, a U-shaped metal backing coacting with the interior of said seating within said recess, and means adjustably associated with said disk and coacting directly with said metal backing for urging said seating outwardly against said casing.

2. In combination, a casing member forming a conduit, a disk valve member swingable within and about an axis extending across said conduit, one of said members having a recess opening directly toward a surface of the other member when said valve member is in closed position, a soft rubber seating disposed within said recess and cooperable directly with said other member surface, a U-shaped metal backing coacting with said seating within said recess, and adjustable means coacting directly with said metal backing for urging said seating outwardly with respect to said recess and against said other member surface.

3. In combination, a casing, a valve disk swingable about an axis extending across said casing and having a peripheral recess opening away from the axis of said disk, a soft rubber seating disposed within said recess and cooperable with the interior of said casing, a U-shaped metal backing coacting with the interior of said seating within said recess, means adjustably associated with said disk and coacting directly with said metal backing for urging said seating outwardly against said casing, and adjustable means associated with said casing and cooperable with a peripheral portion of said valve remote from said axis for moving said valve about said axis to cause said casing to urge said seating against said backing.

4. In combination, a casing member forming a conduit, a disk valve member swingable within and about an axis extending across said conduit, one of said members having a recess opening directly toward a surface of the other member when said valve is in closed position, a soft rubber seating disposed within said recess and cooperable directly with said other member surface, a U-shaped metal backing coacting with said seating within said recess, adjustable means coacting directly with said metal backing for urging said seating outwardly with respect to said recess and against said other member surface, and adjustable means associated with said casing member and cooperable with a peripheral portion of said valve member remote from said axis to move said valve member about said axis to cause said members to urge said seating against said backing.

5. In combination, a casing, a valve disk swingable about an axis extending across said casing and having a peripheral recess opening away from the axis of said disk, a soft rubber seating disposed within said recess and cooperable with the interior of said casing, a U-shaped metal backing coacting with the interior of said seating within said recess, adjustable means associated with said disk and coacting directly with said metal backing to urge said seating outwardly against said casing, a roller carried by a peripheral portion of said valve remote from said axis, and adjustable means associated with said casing and cooperable with said roller to move said valve about said axis to cause said casing to urge said seating against said backing.

In testimony whereof, the signature of the inventor is affixed hereto.

FRANZ SCHMIDT.